Patented May 17, 1949

2,470,354

UNITED STATES PATENT OFFICE 2,470,354

SELF-ALIGNING BEARING CONSTRUCTION

Theodore Y. Korsgren, Reynoldsburg, Ohio, assignor to Crise Manufacturing Company, Columbus, Ohio, a corporation of Ohio Application November 28, 1947, Serial No. 788,593

7 Claims. (Cl. 308—72)

This invention relates to an improved self-aligning shaft bearing, and has for its general object to provide such a bearing which is economical to manufacture and simple and convenient to install in associated apparatus.

It is another object of the invention to provide a bearing of this character employing a dust and dirt excluding disk of fibrous composition together with improved means for retaining the disk in its operative position within the bearing assembly.

For a further understanding of the invention, including additional objects and advantages thereof, reference is to be had to the following description and the accompanying drawings, wherein.

Figure 1:
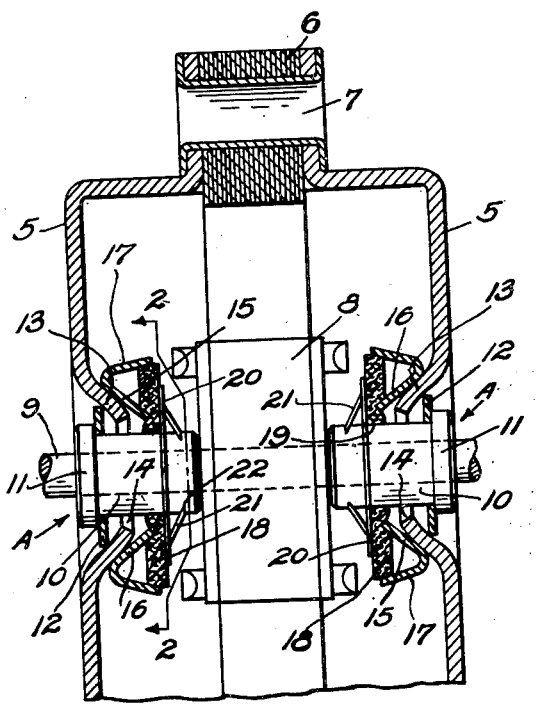
Fig. 1 is a vertical sectional view taken through the casing of an electric motor and disclosing my improved self-aligning bearing structure operatively mounted therein.
Figure 2:
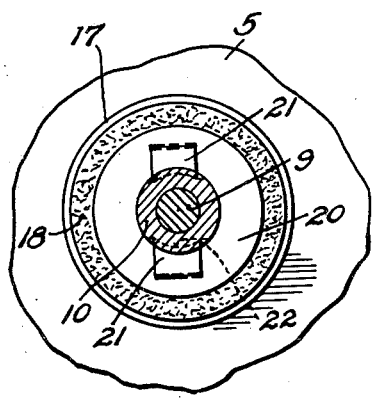
Fig. 2 is a vertical transverse sectional view taken on the plane indicated by the line 2—2 of Fig. 1.

Referring more particularly to the drawings, the numeral 5 designates the frame sections of an electric motor to which my improved bearing structure may be applied. It will be understood that the bearing structure forming the present invention is applicable to many other types of devices in which self-aligning bearings may be used advantageously. Between the frame sections, there are positioned the usual field laminations 6, and the frame sections and the laminations are held together, for example, by the employment of tubular eyelets of the character indicated at 7. The armature 8 of the motor carries the usual armature shaft 9 and this shaft is adapted to be supported by the self-aligning bearings, indicated generally at A, comprising the present invention.

The bearings A are of duplicate construction and are mounted in the sides of the motor frame sections 5 in longitudinal alignment. Each bearing comprises a bearing sleeve 10, which is preferably of the oilless type, known commercially as the "Oilite" bearing. Each of the sleeves is formed at its outer end with an enlarged circular head 11 which engages with an outer metallic washer 12, the body of the bearing sleeve passing through the opening of the washer. Preferably, the washer engages with the outer surfaces of an arcuately curved and inwardly projecting extension 13 integrally formed with the frame sections 5, the said extensions 13 being provided with central openings 14 for the reception of the bearing sleeves 10 in which the armature shaft is received for rotation. It will be noted that the edge contact of the washers 12 with the outer curved surfaces of the frame extensions 13 provides for limited rocking movement of the bearing sleeves to adapt the same to the alignment of the shaft 9.

To retain the sleeves against longitudinal displacement relative to the supporting frames 5, I provide each of the bearings with an inner metallic washer 15. Each of these inner washers comprises a frusto-conical body portion 16 which has engagement with the curved inner surfaces of the associated frame extension 13, the body portion terminating in an inwardly and laterally directed annular flange 17. Held between the edges of the body portion 16 and the flange 17 of the washer 15 of each bearing is a moisture and dirt-excluding disk 18 of a compressible fibrous material, the surfaces of the axial opening 19 of each disk bearing on the outer surfaces of each of the associated bearing sleeves.

To hold these bearing parts together against longitudinal separation and to maintain their operative positions in and on the frame sections 5, I employ locking washers 20, which are known in the art by the term "speed nut." Each of the washers 20 is formed from sheet metal having a central opening for the reception of one of the bearing sleeves 10. The inner face of the washer is placed against the outer surface of each associated sealing disk 18 and is so held by the provision of spring means 21 which are struck from the body of each of the washers 20 and extend angularly therefrom, the free or inner ends of the tongues being engaged with notches 22 provided in the outer surfaces of the bearing sleeves.

Figure 3:
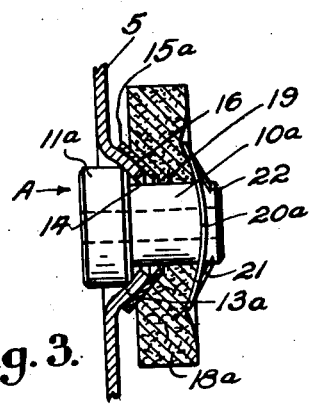
Fig. 3 is a detail vertical sectional view showing a slightly modified form of my improved bearing.

In the modified form of the invention disclosed in Fig. 3, the headed end 11a of the bearing sleeve 10a has one edge thereof in direct contact with the arcuate frame protuberance or extension 13a. The inner washer 15a possesses a dished or arcuate cross section corresponding substantially with the configuration of the extension 13a, so as to be rockably movable thereon. The sealing disk 18a is preferably somewhat thicker than the disk 18, and in this form of my invention, the disk 18a is not confined by a washer flange, such as that indicated at 17 in Fig. 1.

To hold the assembly together, a lock washer 20a is employed, which in Fig. 3 is shown as being of convex configuration in order to hold the disk against inward longitudinal movement and also to maintain the wall surfaces of the axial opening thereof in close contact with the associated bearing sleeve 10a.

By these constructions, a quick and ready assembly of the bearings is made possible and the use of threaded fastening and positioning devices eliminated. The bearings, when assembled, readily adapt themselves to any normal misalignment of a supported shaft carried by the frame bearings, and eliminate the necessity for extremely careful workmanship in constructions requiring the employment of bearing-supported shafts.

I claim:

1. Self-aligning bearing construction comprising a sleeve formed for the reception of a rotatable shaft, a supporting frame having a laterally offset arcuate protrusion provided with an opening in which said sleeve is loosely positioned, means carried by said sleeve having edge contact with the wall surfaces of said protrusion on one side thereof, a washer loosely positioned on said sleeve in contact with the wall surfaces of said protrusion on the opposite side of the latter with respect to that contacted by the sleeve-carried means, a dust and dirt excluding disk of compressible composition and formed with an axial opening, said disk being positioned on said sleeve in contact with said washer, and fastening means engaged with said disk and sleeve to maintain the latter against longitudinal displacement with respect to said frame but admitting of limited rocking movement of the sleeve in the opening of said frame protrusion.

2. Self-aligning bearing construction comprising a sleeve having a head at one end thereof and an axial passage for the reception of a rotatable shaft, a supporting frame formed with a wall having a laterally offset protrusion provided with an opening in which said sleeve is loosely positioned, the headed end of said sleeve having edge contact with the wall surfaces of said protrusion on one side thereof, a washer loosely positioned on said sleeve member in contact with the wall surfaces of said protrusion on the opposite side of the latter with respect to that contacted by the head of said sleeve, a dust and dirt excluding disk of compressible composition formed with an axial opening through which said sleeve extends, and fastening means engageable with said disk and sleeve to maintain the latter against longitudinal displacement with respect to said frame but admitting of limited rocking movement of the sleeve walls to said frame.

3. Self-aligning bearing construction comprising a sleeve formed for the reception of a rotatable shaft, a supporting frame having a laterally offset arcuate protrusion provided with an opening in which said sleeve is loosely positioned, means carried by said sleeve having edge contact with the wall surfaces of said protrusion on one side thereof, a washer loosely positioned on said sleeve in contact with the wall surfaces of said protrusion on the opposite side of the latter with respect to that contacted by the sleeve-carried means, a dust and dirt excluding disk of compressible composition and formed with an axial opening, said disk being positioned on said sleeve in contact with said washer, and fastening means engaged with said disk and sleeve to maintain the latter against longitudinal displacement with respect to said frame but admitting of limited rocking movement of the sleeve in the opening of said frame protrusion, said fastening means embodying a circular plate provided with an opening for the reception of said sleeve, the plate being formed with angularly displaced resilient means, the free ends of the latter engaging with notches formed in said sleeve.

4. Self-aligning bearing construction comprising a sleeve having a head at one end thereof and an axial passage for the reception of a rotatable shaft, a supporting frame formed with a wall having a laterally offset protrusion provided with an opening in which said sleeve is loosely positioned, the headed end of said sleeve having edge contact with the wall surfaces of said protrusion on one side thereof, a washer loosely positioned on said sleeve member in contact with the wall surfaces of said protrusion on the opposite side of the latter with respect to that contacted by the head of said sleeve, a dust and dirt excluding disk of compressible composition formed with an axial opening through which said sleeve extends, and fastening means engageable with said disk and sleeve to maintain the latter against longitudinal displacement with respect to said frame but admitting of limited rocking movement of the sleeve walls to said frame, said fastening means embodying a circular plate provided with an opening for the reception of said sleeve, the plate being formed with angularly displaced resilient means, the free ends of the latter engaging with notches formed in said sleeve.

5. Self-aligning bearing construction comprising a sleeve having a head at one end thereof and an axial passage for the reception of a rotatable shaft, a supporting frame formed with a wall having a laterally offset protrusion provided with an opening in which said sleeve is loosely positioned, the headed end of said sleeve having edge contact with the wall surfaces of said protrusion on one side thereof, a washer loosely positioned on said sleeve member in contact with the wall surfaces of said protrusion on the opposite side of the latter with respect to that contacted by the head of said sleeve, a dust and dirt excluding disk of compressible composition formed with an axial opening through which said sleeve extends, and fastening means engageable with said disk and sleeve to maintain the latter against longitudinal displacement with respect to said frame but admitting of limited rocking movement of the sleeve walls to said frame, said fastening means embodying a circular plate provided with an opening for the reception of said sleeve, the plate being formed with angularly displaced resilient means, the free ends of the latter engaging with notches formed in said sleeve, said washer having arcuate walls conforming with those of the wall surfaces of said protrusion with which the washer contacts.

6. Self-aligning bearing construction comprising a sleeve formed for the reception of a rotatable shaft, a supporting frame having a laterally offset protrusion provided with an opening in which said sleeve is loosely positioned, means carried by said sleeve having edge contact with the wall surfaces of said protrusion on one side thereof, a washer loosely positioned on said sleeve in contact with the wall surfaces of said protrusion on the opposite side of the latter with respect to that contacted by the sleeve-carried means, a dust and dirt excluding disk of compressible composition and formed with an axial opening, said disk being positioned on said sleeve in contact with said washer, and fastening means engaged with said disk and sleeve to maintain the latter against longitudinal displacement with respect to said frame but admitting of limited rocking movement of the sleeve in the opening of said frame protrusion.

7. Self-aligning bearing construction comprising a sleeve formed for the reception of a rotatable shaft, a supporting frame having a laterally offset arcuate protrusion provided with an opening in which said sleeve is loosely positioned, means carried by said sleeve having edge contact with the wall surfaces of said protrusion on one side thereof, a washer loosely positioned on said sleeve in contact with the wall surfaces of said protrusion on the opposite side of the latter with respect to that contacted by the sleeve-carried means, a dust and dirt excluding disk of compressible composition and formed with an axial opening, said disk being positioned on said sleeve in contact with said washer, and fastening means engaged with said disk and sleeve to maintain the latter against longitudinal displacement with respect to said frame but admitting of limited rocking movement of the sleeve in the opening of said frame protrusion, said washer being formed peripherally with an out-turned flange for the reception of the outer circumferential edge portions of said disk.

THEODORE Y. KORSGREN.

No references cited.